United States Patent [19]

Berry et al.

[11] Patent Number: 5,544,349

[45] Date of Patent: Aug. 6, 1996

[54] METHOD AND SYSTEM FOR IMPROVING THE PERFORMANCE OF MEMORY IN CONSTRAINED VIRTUAL MEMORY ENVIRONMENTS BY REDUCING PAGING ACTIVITY

[75] Inventors: Robert F. Berry; Michael R. Fortin, both of Austin, Tex.

[73] Assignee: International Business Machines Corporation, Armonk, N.Y.

[21] Appl. No.: 376,713

[22] Filed: Jan. 23, 1995

[51] Int. Cl.⁶ .................................................. G06F 12/00
[52] U.S. Cl. .......................................... 395/492; 395/444
[58] Field of Search ........................... 395/444, 481, 395/492

[56] References Cited

U.S. PATENT DOCUMENTS

| | | | |
|---|---|---|---|
| 4,047,160 | 9/1977 | Wolf | 364/421.08 |
| 4,742,447 | 5/1988 | Duvall et al. | 395/375 |
| 4,758,946 | 7/1988 | Shar et al. | 395/416 |
| 4,989,134 | 1/1991 | Shaw | 395/600 |
| 5,125,086 | 6/1992 | Perazzsoli, Jr. | 395/486 |
| 5,159,677 | 10/1992 | Rubsam et al. | 395/402 |
| 5,237,460 | 8/1993 | Miller et al. | 360/8 |
| 5,239,643 | 8/1993 | Blount et al. | 395/600 |
| 5,247,638 | 9/1993 | O'Brien et al. | 395/888 |
| 5,280,600 | 1/1994 | Van Maren et al. | 360/48 |
| 5,283,880 | 2/1994 | Marcias-Garza | 395/445 |
| 5,293,599 | 3/1994 | Kagimasa et al. | 395/486 |

FOREIGN PATENT DOCUMENTS 9217844  10/1992  WIPO .............................. G06F 12/02

*Primary Examiner*—David L. Robertson
*Attorney, Agent, or Firm*—Benman Collins & Sawyer

[57] ABSTRACT

A method and system for improving the performance of memory in constrained virtual memory environment by reducing physical paging activity is provided. Accordingly, in a method and system in accordance with the present invention, the pages stolen or removed from the active processes are compressed then placed in the free list. In so doing, the additional space provided via this compression allows for more real memory to be available for other purposes.

8 Claims, 4 Drawing Sheets

METHOD AND SYSTEM FOR IMPROVING THE PERFORMANCE OF MEMORY IN CONSTRAINED VIRTUAL MEMORY ENVIRONMENTS BY REDUCING PAGING ACTIVITY

FIELD OF THE INVENTION

The present invention relates to memory constrained environments, and more particularly to improving the performance of memory by reducing physical disk paging activity.

BACKGROUND OF THE INVENTION

A computer implementing a virtual memory system typically employs a certain amount of "physical" memory composed of relatively fast semiconductor RAM devices, along with a much larger amount of "virtual" memory composed of hard disk, where the access time of the hard disk is perhaps several hundred times that of the RAM devices. The virtual memory management scheme uses an operating system such as UNIX™ along with hardware including a translation buffer, and is well known. In multitasking operating systems where more than one program runs at the same time, each running in a time slice of its own, each program appears to have an entire memory space to itself. To make room in the physical memory to run a new program, or to allocate more memory for an already-running program, the memory management mechanism either "swaps" out an entire program (process) to disk memory or "pages" out a portion (page) of an existing process to disk.

Transferring data to and from disk memory is very slow compared to the transfer time to main memory, and so "solid state disks" (composed of semiconductor RAMs like the main memory) have been used as a substitute for magnetic disk to improve system performance. This is at a much higher cost per megabyte of storage, however, due to the cost of semiconductor RAMs. Data compression has not been used because of the variable-length record problem as discussed below, i.e., compressed data blocks are of variable size, making random access of compressed "pages" of data impractical.

In memory-constrained environments a certain percentage of the pages of the total virtual storage in use will not actually be resident in the machine's physical memory frames. These pages, when referenced, must be brought into memory from the paging space (which is kept on physical disk) in a page fault operation. Such page faults are expensive because physical disk operations typically take tens of milliseconds, all of which time the faulting application must wait.

Ideally, a configuration will have sufficient real memory to avoid continuous page fault activity. Because of both the expense of memory, and the difficulty of sizing memory requirements, this is not always the case. Packaging requirements for portable machines (e.g., laptops) are likely to exacerbate this problem.

SUMMARY OF THE INVENTION

A method and system for reducing physical paging activity from a memory in a computer system is disclosed. The memory is divided into two areas, the active process portion and the free list portion. In a method and system in accordance with the present invention, certain pages taken from active process (i.e., 'stolen') are compressed before being placed on the free list. Thereafter, for every page fault, the free list is first searched. Because there is additional room in the real memory (due to the compression of certain stolen pages), there is a much greater chance that a physical page fault (involving a disk I/O) will not be necessary.

Pages placed on the free list that might be reclaimed are compressed. This means that less space is taken up by the information in these pages, and that remaining can be used for other purposes (such as maintaining a larger free list, or more pages in use).

Page faults are handled in the following manner. First, the free list is searched; if the page is found and is not in a compressed form, then it is reclaimed. If not found, then the page fault is handled in the customary manner: a frame must be allocated from the free list, and the page must be brought in from paging space via disk I/O. If the page is found on the free list in a compressed form, then a free frame is obtained from the free list, the compressed page is uncompressed into that frame, and the page is removed from the free list.

DESCRIPTION OF THE INVENTION

The present invention relates to an improvement in the accessing of data within a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
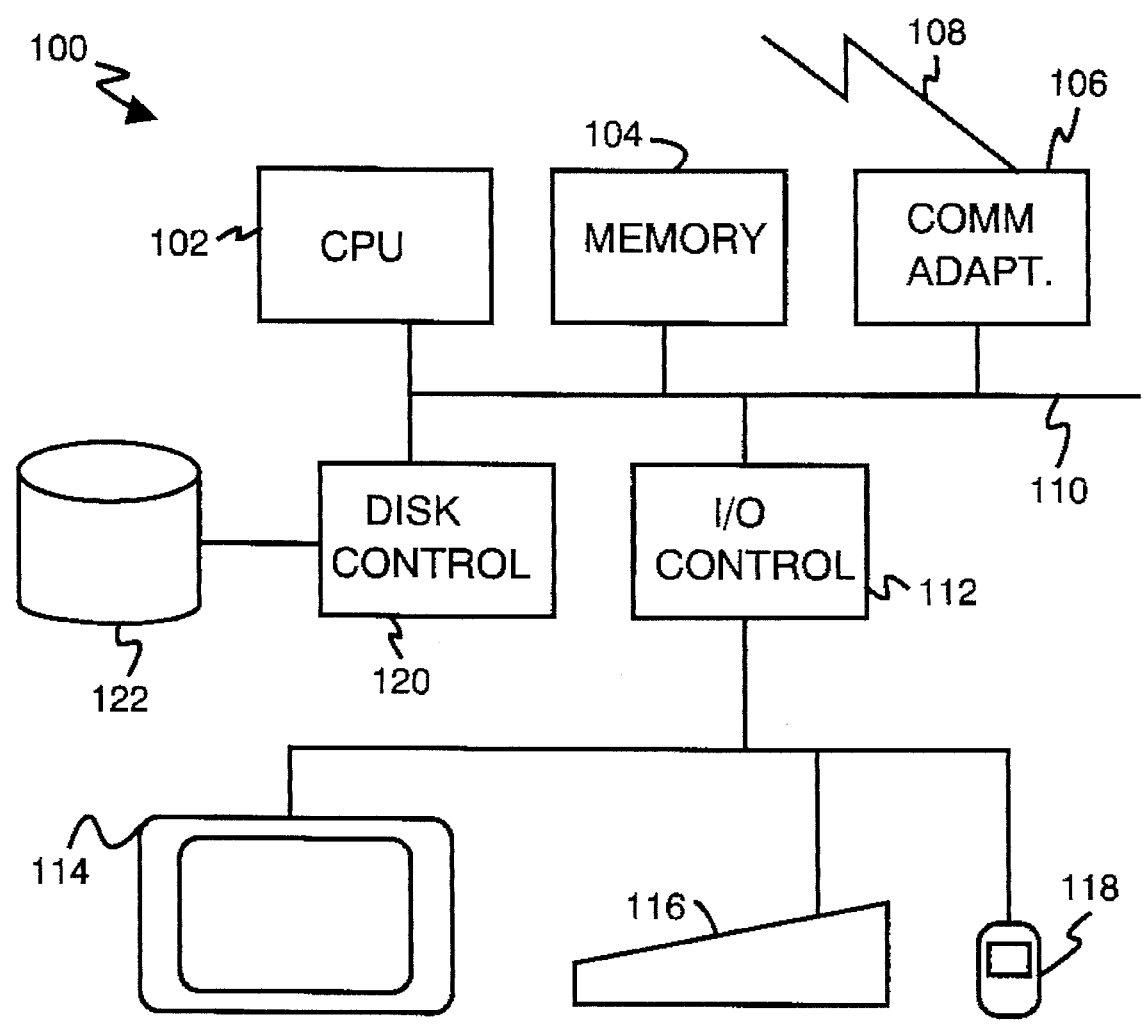
FIG. 1 is a block diagram of a computer system in accordance with the present invention.

More particularly, the present invention is directed to the operation of a computer system having the components shown generally in FIG. 1. Processing is provided by a central processing unit (CPU) 102. CPU 102 acts on instructions and data stored in random access memory 104. One or more disks 122, controlled by a disk controller 120, provide long term and paging storage. A variety of other storage media could be employed, including tape, CD-ROM, or WORM drives. Removable storage media may also be provided to store data or computer process instructions.

Users communicate with the system through I/O devices which are controlled by I/O controller 112. Display 114 presents data to the user, while keyboard 116 and pointing device 118 allow the user to direct the computer systems. Communications adapter 106 controls communications between this processing unit and other processing units connected to a network by network interface 108.

While this invention is described in the context of a computer system depicted in FIG. 1., it should be noted that the invention applies to any computer system employing pageable virtual memory. Such systems might include a subset of the components indicated in FIG. 1. Further, the organization of those components might differ, e.g., physical paging in such a system might be handled remotely, over a network.

Real memory in most virtual memory systems (including the IBM AIX operating system) can be divided into two categories—in use, and on the free list. Page frames on the free list are comprised of pages returned by terminated processes, and pages stolen from active processes. Frames stolen from an active process are eligible for reclaiming by that process, if referenced before the frame is re-allocated.

In a method and system in accordance with the proposed invention, pages that are stolen are first compressed before placing them on the free list. Pages from terminated processes are not compressed (since it is unlikely they will be reclaimed).

In conventional virtual memory systems, pages make their way to the free list for several reasons. First, when a process terminates, all of its pages are added. It is unlikely (although possible) that these pages will be reclaimed. Second, when the demand for real memory reaches a certain level (e.g., in some computer architectures, such as the IBM AIX operating system this is signalled by the free list size falling below a threshold), an algorithm is initiated to identify candidate pages to steal from active processes. Typically, this algorithm selects pages that have not been referenced recently ('aged pages').

Figure 2:
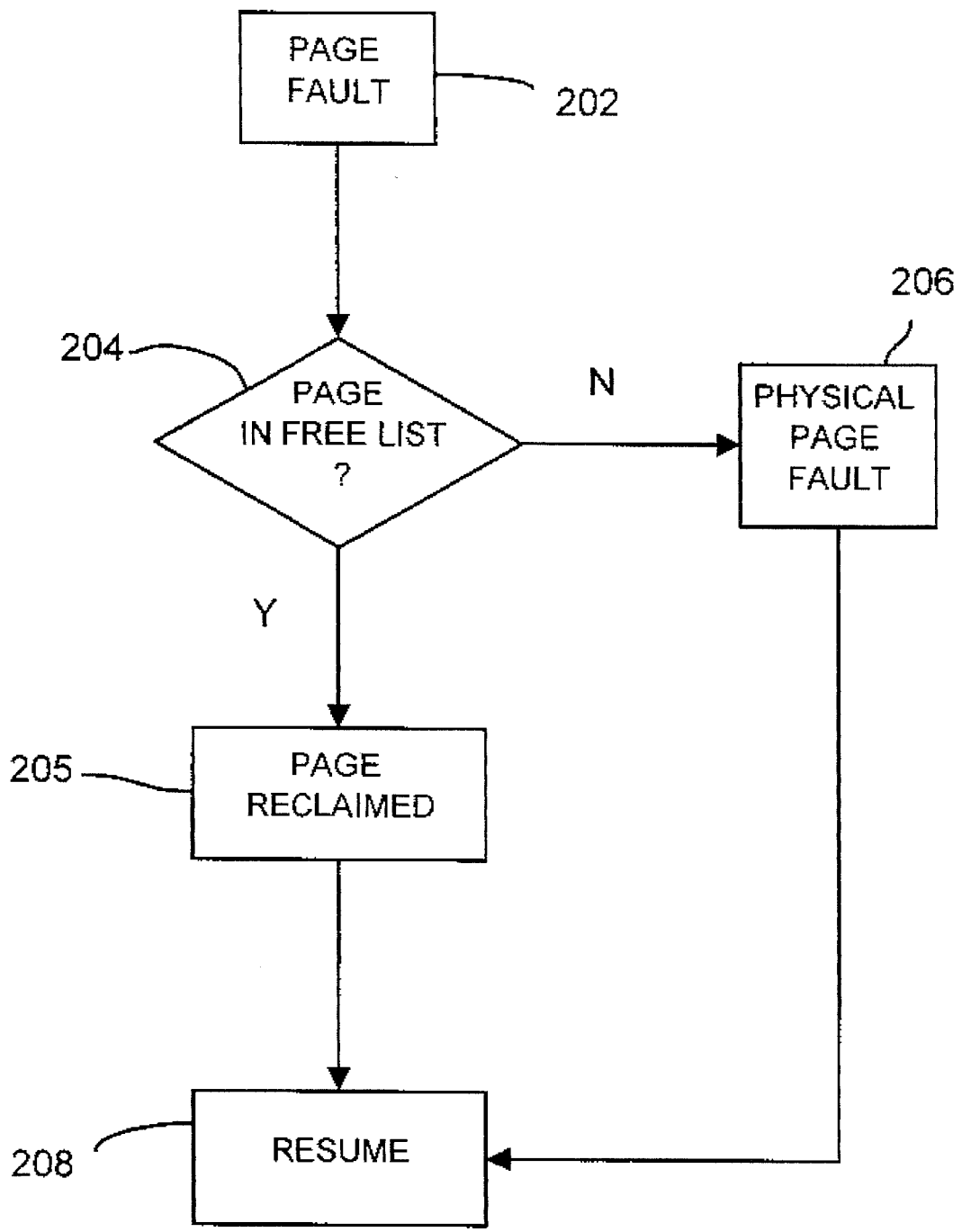
FIG. 2 is a block diagram of a flow chart of a prior art virtual memory management system.

Referring now to FIG. 2, what is shown is a flow chart of operation of a conventional virtual memory management system. In such a system, the memory is divided into two categories, the portion of the memory in use and a free list portion. In such a memory as has been mentioned, the free list portion comprises pages returned from terminated processes and pages stolen from active processes. Accordingly, when a page fault occurs via step 202, the free list is searched, via step 204. If the page is in the free list, the page is reclaimed from the free list via step 205 and the process resumes via step 208. On the other hand, if the page is not in the free list, a physical page fault (i.e., one involving disk I/O) is required via step 208.

As has been before mentioned, in memory-constrained virtual memory environments a certain percentage of the pages of the total virtual storage in use will not actually be resident in the machine's physical memory frames. As has also been previously mentioned, these pages, when referenced, must be brought into memory from the paging space (which is kept on physical disk) in a physical page fault operation.

Due to inherent limitations in the physical operations of seeking and rotational latency in I/O operations, advances in the performance of physical I/O operations have not kept up with those in processor speed. This means that the cost (in time, and added resource consumption) of taking a page fault grows as the gap between processor speed and I/O latency widens. Further, as certain configurations become more distributed the added cost of network latency/contention compounds the penalty of faulting off the computer; for memory constrained environments this is not a viable alternative. While certain architectures have addressed this problem with electronic disks, or expanded page-addressable memory (both apply to the System/390 architecture, for example), these solutions incur the added cost of specialized hardware.

In a method and system in accordance with the present invention, many of the pages that are stolen from active processes are first compressed before placing them in a free list. In so doing, more real memory remains for other purposes.

Figure 3:
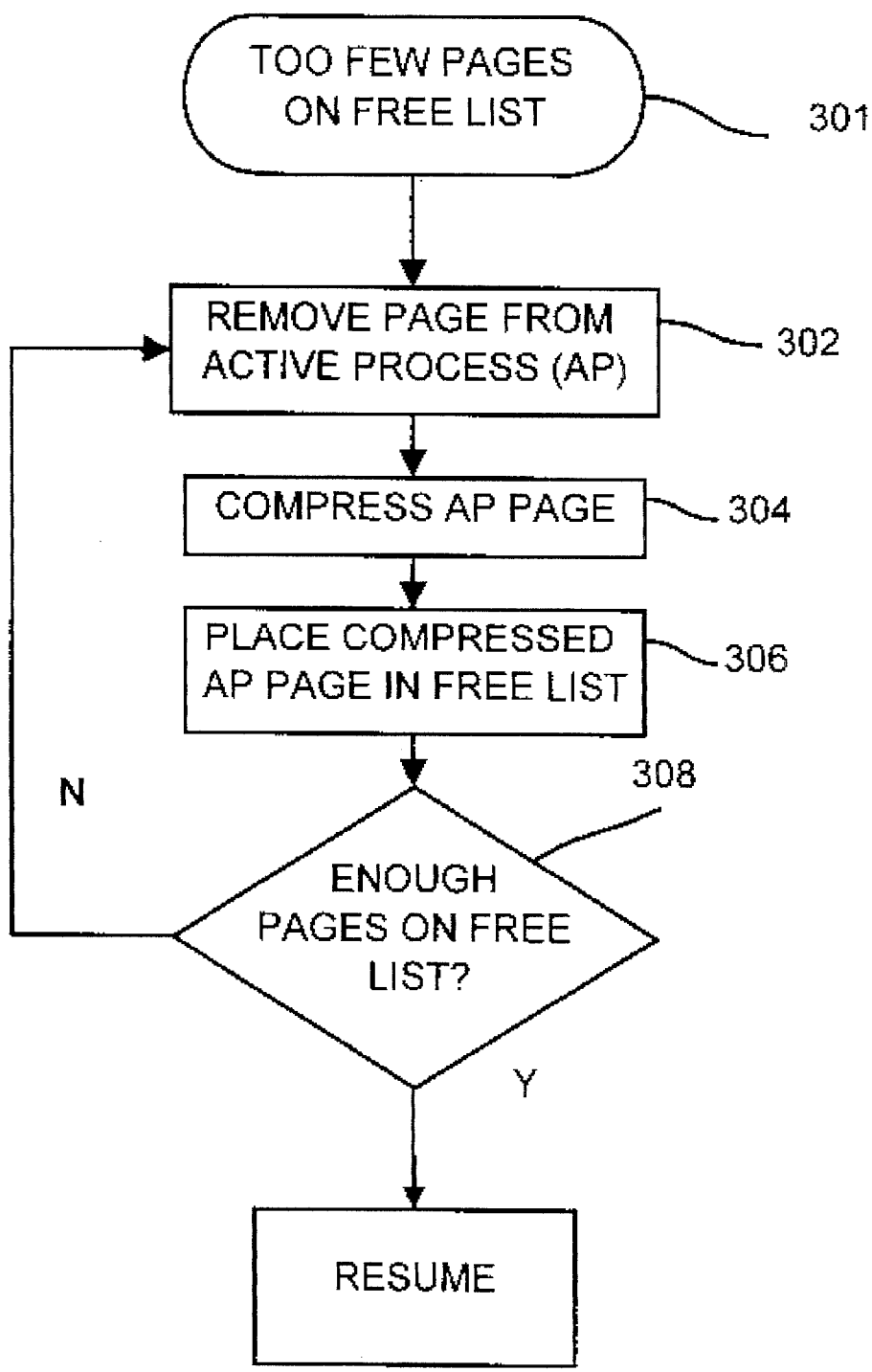
FIGS. 3 and 4 are flow charts of the operation of a virtual management system in accordance with the present invention.
Figure 4:
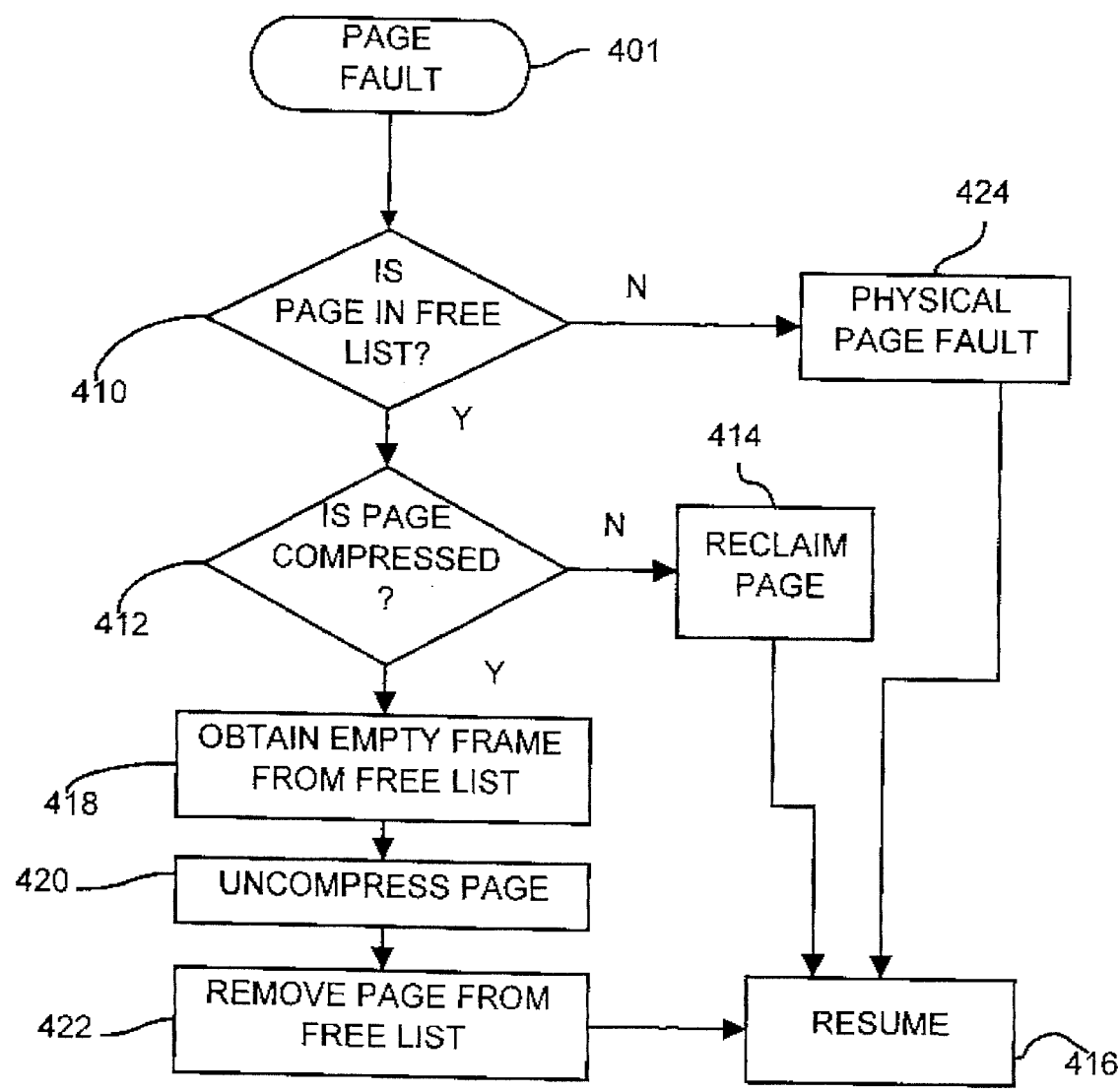

To more clearly illustrate the operation of a virtual memory system in accordance with the present invention, refer now to FIGS. 3 and 4 which are flow charts of the operations. As is seen, if the free list has too few pages then a page is removed from the active process via step 302. Thereafter, the active process page is compressed, via step 304. Then, the compressed active process page is placed in the free list, via step 306. Then it is determined if there are enough pages in the free list, via step 308. If there are not enough, then return to the page removing step 302. If on the other hand if there are enough, normal operations are resumed.

On encountering a page fault 401 it must be determined whether there is the desired page in the free list. Since the active process pages are being compressed on a continual basis, there is a good possibility that an active process page is in the free list. Therefore the physical page fault activity, via step 424 is not utilized nearly as frequently.

Accordingly, if the page is in the free list then it must be determined if the page is compressed, via step 412. If the page is not compressed, then the page can be reclaimed via step 414 and the faulting application can resume operation, via step 416. On the other hand if the page has been compressed, then an empty frame is obtained from the free list, via step 418. Thereafter the active process page is uncompressed into that frame, via step 420 and the active process page is removed from the free list, via step 422. Thereafter, the faulting application can then resume its operation via step 416. A system approach and method in accordance with the present invention effectively increases the size of real memory (at the expense of compression and uncompression computation—as well as the cost of its management).

The extent to which memory is 'enlarged' is a function of compression factor (i.e., ratio of a page size to the size of a compressed page). The additional page frames provided by this approach could be used for a variety of reasons—however, two possibilities are:

The frames could be employed to maintain a larger free list. Depending on the compression factor it is possible that all pages of virtual storage could be maintained compressed in this larger free list. Note that this would essentially eliminate all repaging I/O on a system. Repaging I/O is physical paging activity caused when a page once in memory has gone unreferenced long enough to result in being stolen; when re-referenced, the page must be brought back into memory with a physical paging I/O.

The frames could be used for in use pages. This could improve the ability of the system to provide an application's working set with the frames it requires for good performance.

In addition, second-order benefits include a reduced load on disk devices due to fewer re-page operations that go to disk. The compression and uncompression of pages could be performed equally well by hardware or software. (While a hardware implementation would likely improve the trade-off between the cpu required for compression and the resulting reduced re-paging I/O activity, it would do so at the cost of added hardware). Finally, a particular implementation of a method or system of the present invention might not compress certain pages since there may be little benefit realized from doing so. For example, certain pages might not exhibit satisfactory compression characteristics (i.e., when compressed, they may require almost as much memory as when uncompressed).

Although the present invention has been described in accordance with the embodiments shown, one of ordinary skill in the art will readily recognize that there could be variations to the embodiments and those variations would be within the spirit and scope of the present invention. Hence, it is understood that a system in accordance with the present invention could be utilized with a variety of virtual memory systems, that use would be within the spirit and scope of the present invention. It should also be understood that this method and system of the present invention could be utilized with a wide variety of computer systems, and that use would be within the spirit and scope of the present invention. Accordingly, many modifications may be made by one of ordinary skill in the art without departing from the spirit and scope of the appended claims.

What is claimed is:

1. A method for reducing physical paging of a memory in a computer system, the computer system including a memory, the memory including an active process portion and a free list portion, the method comprising the steps of:

(a) removing a page from the active process portion;

(b) compressing the page; and (c) placing the compressed page in the free list portion.

2. The method of claim 1 further comprising the steps of:

(d) determining if a page fault has occurred;

if no page fault has occurred then return to page removing step (a);

if a page fault has occurred, then;

(e) obtaining an appropriate page from the free list portion; and (f) resuming operation of the computer system.

3. The method of claim 2 in which appropriate page obtaining step (e) further comprises the steps of:

(e1) determining if the appropriate page is in the free list portion;

if the page is in the free list portion;

(e2) determining if the appropriate page is compressed;

if the appropriate page is not compressed;

(e3) reclaiming the appropriate page from the free list portion; and returning to step (f);

if the appropriate page is compressed;

(e4) obtaining an empty frame from the free list portion;

(e5) uncompressing the appropriate page;

(e6) removing the appropriate page from the free list portion and returning to step f.

4. The method of claim 3 which further comprises the step of:

if the page is not in the free list portion;

(e7) servicing a physical page fault to a disk.

5. A system for reducing physical paging of a memory in a computer system, the computer system including a memory, the memory including an active process portion and a free list portion, the method comprising the steps of:

means for removing a page from the active process portion;

means responsive to the page removing means for compressing the page; and means responsive to the page compressing means for placing the compressed page in the free list.

6. The system of claim 5 further comprising:

means responsive to the placing means for determining if a page fault has occurred;

means responsive to page fault determining means for obtaining an appropriate page from free list portion if a page fault has occurred; and means responsive to the obtaining means for resuming operation of the computer system.

7. The system of claim 6 in which appropriate page obtaining means further comprises:

first means for determining if the appropriate page is in the free list portion;

second means responsive to the first determining means for determining if the appropriate page is compressed if the page is in the free list portion;

means responsive to the second determining means for reclaiming the appropriate page from the free list portion if the appropriate page is not compressed; and if the appropriate page is compressed means responsive to the reclaiming means for obtaining an empty frame from the free list portion if the appropriate page is compressed;

means responsive to the empty frames uncompressing obtaining means for the appropriate page;

means responsive to the uncompressing means removing the appropriate page from the free list portion.

8. The method of claim 7 which further comprises means for servicing a page fault to a disk if the page is not in the free list portion.

* * * * *